United States Patent
Aibara et al.

(10) Patent No.: US 9,020,323 B2
(45) Date of Patent: Apr. 28, 2015

(54) COMMUNICATION APPARATUS AND STORAGE MEDIUM

(75) Inventors: Takehiro Aibara, Hamura (JP); Hitoshi Amagai, Fussa (JP); Naotaka Uehara, Higashimurayama (JP); Takayuki Kogane, Akishima (JP); Sumito Shinohara, Akiruno (JP); Masato Nunokawa, Fussa (JP); Tetsuya Handa, Fussa (JP); Kimiyasu Mizuno, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 319 days.

(21) Appl. No.: 13/071,966

(22) Filed: Mar. 25, 2011

(65) Prior Publication Data
US 2011/0235987 A1    Sep. 29, 2011

(30) Foreign Application Priority Data

Mar. 26, 2010 (JP) ................................. 2010-073659

(51) Int. Cl.
*H04N 5/765* (2006.01)
*H04W 88/02* (2009.01)

(52) U.S. Cl.
CPC ..................................... *H04W 88/02* (2013.01)

(58) Field of Classification Search
CPC ...................................................... H04N 5/76
See application file for complete search history.

(56) References Cited

U.S. PATENT DOCUMENTS

| 7,734,307 B2 | 6/2010 | Dawidowsky |
| 8,311,399 B2 | 11/2012 | Dui et al. |
| 2009/0264068 A1 | 10/2009 | Washiro |

(Continued)

FOREIGN PATENT DOCUMENTS

| CN | 1705365 A | 12/2005 |
| CN | 1767409 A | 5/2006 |
| CN | 101018323 A | 8/2007 |

(Continued)

OTHER PUBLICATIONS

Japanese Office Action dated Feb. 28, 2012 (and English translation thereof) in counterpart Japanese Application No. 2010-073659.

(Continued)

*Primary Examiner* — William C Vaughn, Jr.
*Assistant Examiner* — Eileen Adams
(74) *Attorney, Agent, or Firm* — Holtz, Holtz, Goodman & Chick PC

(57) ABSTRACT

Provided are a communication apparatus and program which improve the operability for a user before and during data communication. The communication apparatus includes a plurality of communication units that establish electric field coupling or magnetic field coupling with a communication device located within a predetermined distance, a storage unit storing control information indicative of predetermined control contents in association with the respective communication units, a control information acquisition section that acquires, from the storage unit, control information associated with that communication unit which has established the electric field coupling or the magnetic field coupling, and a control unit that controls communication of that of the communication units which has established the electric field coupling or the magnetic field coupling by using the control information acquired by the control information acquisition section.

7 Claims, 12 Drawing Sheets

(56) References Cited

U.S. PATENT DOCUMENTS

| | | | |
|---|---|---|---|
| 2009/0290027 A1* | 11/2009 | Namekawa et al. | 348/207.1 |
| 2010/0048132 A1* | 2/2010 | Sugisaki et al. | 455/41.3 |

FOREIGN PATENT DOCUMENTS

| | | |
|---|---|---|
| CN | 101645129 A | 2/2010 |
| JP | 2008-312074 A | 12/2008 |
| JP | 2009-260725 A | 11/2009 |
| JP | 2009-278267 A | 11/2009 |
| JP | 2010-050924 A | 3/2010 |
| JP | 2010-226214 | 10/2010 |

OTHER PUBLICATIONS

Japanese Office Action dated May 8, 2012 (and English translation thereof) in counterpart Japanese Application No. 2010-073659.
Chinese Office Action dated Mar. 15, 2013 (and English translation thereof) in counterpart Chinese Application No. 201110069694.0.

* cited by examiner

| ID INFORMATION | SELECTION INFORMATION |
|---|---|
| 110a | SET |
| 110b | MOVE UPWARD |
| 110c | MOVE DOWNWARD |
| 110d | MOVE RIGHTWARD |
| 110e | MOVE LEFTWARD |

FIG. 4

| ID INFORMATION | DISPLAY CONTROL INFORMATION |
|---|---|
| 110a | NORMAL PLAYBACK |
| 110b | FAST FORWARD |
| 110c | REWIND |
| 110d | MOVE TO NEXT CHAPTER |
| 110e | RETURN TO PREVIOUS CHAPTER |

FIG. 5

| $X = Ec2 - Ec1$ (110b - 110a) | FAST-FORWARD SPEED CONTROL INFORMATION |
|---|---|
| $a < X \leq b$ | x1.5 SPEED |
| $b < X \leq c$ | x3 SPEED |
| $c < X \leq d$ | x4.5 SPEED |
| $d < X \leq e$ | x6 SPEED |

FIG. 6

| Y = Ec3 − Ec1 (110c − 110a) | REWIND SPEED CONTROL INFORMATION |
|---|---|
| f < Y ≦ g | x1.5 SPEED |
| g < Y ≦ h | x3 SPEED |
| h < Y ≦ i | x4.5 SPEED |
| i < Y ≦ j | x6 SPEED |

COMMUNICATION APPARATUS AND STORAGE MEDIUM

CROSS REFERENCES TO RELATED APPLICATION

This application claims the benefit of Japanese Patent Application No. 2010-073659 filed on Mar. 26, 2010, the entire disclosure of which is incorporated by reference herein.

FIELD

The present invention relates to a communication apparatus and a storage medium.

BACKGROUND

Recently, techniques of performing data communication at a communication speed (communication band) of several hundred Mbps between communication apparatuses set (placed) close to each other at a predetermined distance of 3 cm or so (so-called near field wireless communication systems) have been developed. For example, Unexamined Japanese Patent Application KOKAI Publication No. 2008-312074 discloses a technique of transferring high-frequency signals of an UWB (Ultra Wide Band) through electric field coupling, such as electrostatic field coupling or induction field coupling, between a communication apparatus and a communication counterpart when the communication apparatuses are placed close to each other at a predetermined distance of 3 cm or so. This technique allows communication apparatuses to exchange a content, such as a video or music, in several seconds even if the amount of data of the content is over several hundred megabytes.

However, the technique disclosed in the publication requires that a user should perform an operation of selecting data to be transmitted from plural pieces of data before data communication when the data is transmitted from a communication apparatus storing the plural pieces of data to another communication apparatus. When data is transmitted from one communication apparatus to another communication apparatus having a plurality of data storage locations, a user needs to perform an operation of selecting a storage location for the data to be received from the plurality of data storage locations.

While the technique disclosed in the publication enables fast forward, rewind, etc. of streaming by operating a fast forward button, a rewind button, etc. provided at a communication apparatus or the like in case of performing streaming at the time of data communication, it needs to address the difficulty of operating buttons when communication apparatuses are set close to each other.

SUMMARY

Accordingly, it is an object of the present invention to provide a communication apparatus and a storage medium which can improve the operability for a user before and during data communication.

To achieve the object, a communication apparatus according to a first aspect of the invention comprises: a plurality of communication units that establish electric field coupling or magnetic field coupling with a communication device located within a predetermined distance; a storage unit storing control information indicative of predetermined control contents in association with the communication units; an acquisition section that acquires control information associated with the communication unit which has established the electric field coupling or the magnetic field coupling from the storage unit; and a control unit that performs predetermined control using the control information acquired by the acquisition section.

According to a second aspect of the invention, a computer readable storage medium storing a communication control program to be executed by a computer, the communication control program causing the computer to perform: an acquisition step of acquiring control information indicative of a predetermined control content associated with a communication unit which has established electric field coupling or magnetic field coupling; and a control step of performing predetermined control using the control information acquired at the acquisition step.

The communication apparatus and storage medium according to the invention can improve the operability for a user before and during data communication.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

A more complete understanding of this application can be obtained when the following detailed description is considered in conjunction with the following drawings, in which:

FIG. 4 is a diagram showing display control information according to the embodiment of the invention;

FIG. 5 is a diagram showing fast-forward speed control information according to the embodiment of the invention;

FIG. 6 is a diagram showing rewind speed control information according to the embodiment of the invention;

DETAILED DESCRIPTION

One embodiment of the present invention will be described below with reference to the accompanying drawings.

Figure 1:
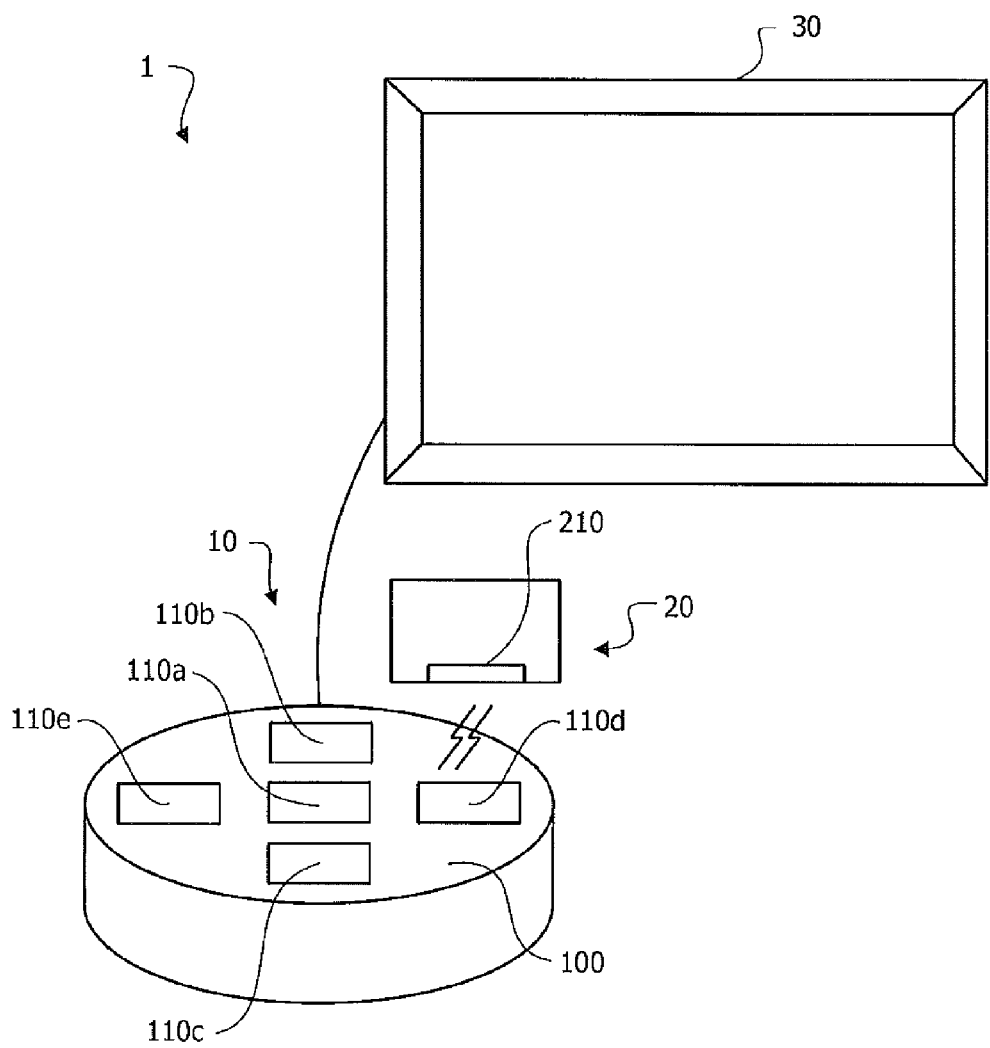
FIG. 1 is a diagram showing the configuration of a communication system according to an embodiment of the invention.

A communication system 1 includes a communication apparatus 10, a portable device 20, and a display device 30, as shown in FIG. 1.

The communication apparatus 10 has five communication units 110a to 110e which are provided at a top surface portion 100 at predetermined positions respectively. The portable device 20 has a communication unit 210. Each of the communication units 110a to 110e of the communication apparatus 10 and the communication unit 210 of the portable device 20, when mutually positioned at a predetermined distance (e.g., 3 cm or so), establish electric field coupling with each other to carry out communication with each other. The communication apparatus 10 stores control information indicative of a predetermined control content in association with each of the communication units 110a to 110e.

As the user of the communication apparatus 10 places the portable device 20 close to the top surface portion 100 of the communication apparatus 10 and moves the portable device 20 in the vicinity of the top surface portion 100, the communication apparatus 10 establishes electric field coupling with the communication unit 210. In this case, the communication apparatus 10 acquires control information associated with the communication unit 110 which has established electric field coupling, and executes predetermined control based on the acquired control information.

The communication apparatus 10 has the top surface portion 100 at which the communication units 110a to 110e are provided, and a computer connected thereto.

The portable device 20 includes a portable communication device, such as a digital movie camera, which has the communication unit 210 capable of communicating with the five communication units 110a to 110e of the communication apparatus 10. The display device 30 includes a liquid crystal television, an organic EL (Electro Luminescence) display, or the like, and displays a video expressed by video/audio data supplied from the communication apparatus 10, and outputs sounds also expressed by the video/audio data.

Figures 2, 3:
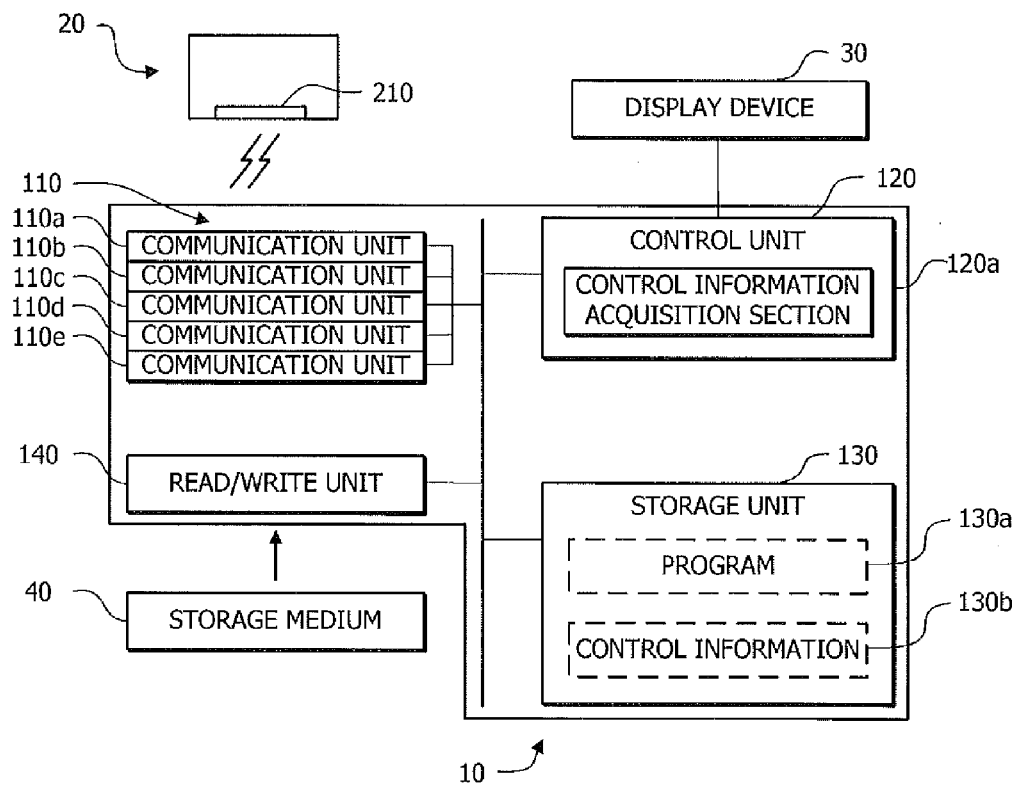
FIG. 2 is a block diagram showing the functional configuration of a communication apparatus according to the embodiment of the invention.
FIG. 3 is a diagram showing selection information according to the embodiment of the invention.

Referring to FIG. 2, the functional configuration of the communication apparatus 10 will be described below. The communication apparatus 10 includes a control unit 120, a storage unit 130 and a read/write unit 140 in addition to the aforementioned communication units 110a to 110e.

When the communication unit 210 of the portable device 20 is placed within a predetermined distance, each of the communication units 110a to 110e establishes electric field coupling with the communication unit 210 to perform communication therewith. Each of the communication units 110a to 110e detects the intensity of an electric field generated in response to the electric field coupling established with the communication unit 210, and supplies the control unit 120 with an electric field signal representing the detected electric field intensity.

The control unit 120 includes a processor or the like to perform the general control of the communication apparatus 10, including control on the individual sections of the communication apparatus 10. The control unit 120 also includes a control information acquisition section 120a that uses the electric field signal received from the communication unit 110 which has detected the electric field intensity (i.e., one of the communication units 110a to 110e) to specify the communication unit 110 which is closest to the communication unit 210 of the portable device 20, and acquires control information associated with the specified communication unit 110 from a control information storage section 130b. Based on the control information acquired by the control information acquisition section 120a, the control unit 120 performs predetermined control indicated by the control information.

The storage unit 130 properly stores various kinds of data including data generated during the process performed by the control unit 120, e.g., recorded data read from a storage medium 40, such as a DVD (Digital Versatile Disc), Blue-ray Disc or flash memory card, under control of the control unit 120. The storage unit 130 has a program storage section 130a and the control information storage section 130b.

Stored in the program storage unit 130a is a communication control program (to be described later) which is read and executed by the control unit 120. Identification information (hereinafter referred to as "ID information) of the individual communication units 110a to 110e and control information indicative of the contents of the control which is executed in response to the electric field coupling of the individual communication units 110a to 110e are stored in the control information storage section 130b in association with each other.

The communication units 110a to 110e are used in various operations according to the operational situations of the communication system 1, not only in one operation. Plural pieces of control information are associated with each of the communication units 110a to 110e according to the operational situations. Accordingly, the ID information of each of the communication units 110a to 110e and plural pieces of control information are stored in the control information storage section 130b in association with each other.

For example, the communication apparatus 10 performs an operation of moving a cursor on a menu according to the movement of the portable device 20 to select and set an item specified by the cursor (hereinafter called "selection operation"). For such an operational situation, the ID information of the communication unit 110 and control information indicative of the contents of the selection process (hereinafter called "selection information" for discrimination from other control information) are stored in the control information storage section 130b in association with each other as shown in FIG. 3, for example. Specifically, the ID information of the communication unit 110a and control information indicative of a "set (selection)" process for a selection target are stored in the control information storage section 130b in association with each other, the ID information of the communication unit 110b and control information indicative of a process of moving the cursor "upward" are stored therein in association with each other, the ID information of the communication unit 110c and control information indicative of a process of moving the cursor "downward" are stored therein in association with each other, the ID information of the communication unit 110d and control information indicative of a process of moving the cursor "rightward" are stored therein in association with each other, and the ID information of the communication unit 110e and control information indicative of a process of moving the cursor "leftward" are stored therein in association with each other.

The control unit 120 selects and sets a selection target based on each selection information associated with each of the communication units 110a to 110e to enable selection of data to be communicated (transmitted) and a communication (transmission) counterpart for the communication data. In other words, individual communication units 110a to 110e function like various selection keys. In this case, the communication unit 110a functions as a set key, the communication unit 110b functions as a UP cursor key, the communication unit 110c functions as a DOWN cursor key, the communication unit 110d functions as a RIGHT cursor key, and the communication unit 110e functions as a LEFT cursor key.

For example, the communication apparatus 10 performs an operation of carrying out streaming reception of data stored in the portable device 20 and outputting the data to the display device 30 (hereinafter called "streaming operation"). For such an operational situation, the ID information of the communication unit 110 and display control information indicative of the contents of display control for data to be displayed on the display device 30 (hereinafter called "display control information" for discrimination from other control information) are stored in the control information storage section 130b in association with each other as shown in FIG. 4, for example. Specifically, the ID information of the communication unit 110a and display control information for performing "normal playback (×1 playback)" are stored in the control information storage section 130b in association with each other, the ID information of the communication unit 110b and display control information for performing "fast forward" are stored therein in association with each other, the ID information of the communication unit 110c and display control information for performing "rewind" are stored therein in association with each other, the ID information of the communication unit 110d and display control information for moving to a "next chapter" are stored therein in association with each other, and the ID information of the communication unit 110e and display control information for moving to a "previous chapter" are stored therein in association with each other.

The control unit 120 controls streaming of communication data based on individual pieces of display control information associated with the respective communication units 110a to 110e to enable playback, stopping, etc. of a streaming video image. In this case, the communication unit 110a functions as a playback key, the communication unit 110b functions as a FAST FORWARD key, the communication unit 110c functions as a REWIND key, the communication unit 110d functions as a NEXT CHAPTER key, and the communication unit 110e functions as a PREVIOUS CHAPTER key.

Further stored in the control information storage section 130b is fast-forward speed control information for controlling the fast forward speed of streaming. This fast-forward speed control information is information on the fast forward speed of streaming associated with the value of the difference (X=Ec2−Ec1) between an electric field intensity Ec1 detected by the communication unit 110a and an electric field intensity Ec2 detected by the communication unit 110b, for each given range.

For example, with regard to the value of the difference (X=Ec2−Ec1) between the electric field intensity (Ec1) detected by the communication unit 110a and the electric field intensity (Ec2) detected by the communication unit 110b, the control information storage section 130b associates the values of the fast forward speeds with the values of the difference between the electric field intensities acquired from the communication units 110a and 110b for each of given ranges, such as $a<X \le b$ (×1.5 speed), $b<X \le c$ (×3 speed), $c<X \le d$ (×4.5 speed) and $d<X \le e$ (×6 speed) as shown in FIG. 5.

Also stored in the control information storage section 130b is rewind speed control information for controlling the rewind speed of streaming. This rewind speed control information is information on the rewind speed of streaming associated with the value of the difference (X=Ec3−Ec1) between the electric field intensity Ec1 detected by the communication unit 110a and an electric field intensity Ec3 detected by the communication unit 110c, for each given range.

For example, with regard to the value of the difference (X=Ec3−Ec1) between the electric field intensity (Ec1) detected by the communication unit 110a and the electric field intensity (Ec3) detected by the communication unit 110c, the control information storage section 130b associates the values of the rewind speeds with the values of the difference between the electric field intensities acquired from the communication units 110a and 110c for each of given ranges, such as $f<Y \le g$ (×1.5 speed), $g<Y \le h$ (×3 speed), $h<Y \le i$ (×4.5 speed) and $i<Y \le j$ (×6 speed) as shown in FIG. 6.

The read/write unit 140 in FIG. 2 reads recorded data recorded in the storage medium 40, and supplies it to the control unit 120 under control thereof. The read/write unit 140 also writes (records) the recorded data in the storage medium 40 under control of the control unit 120.

Figure 7:
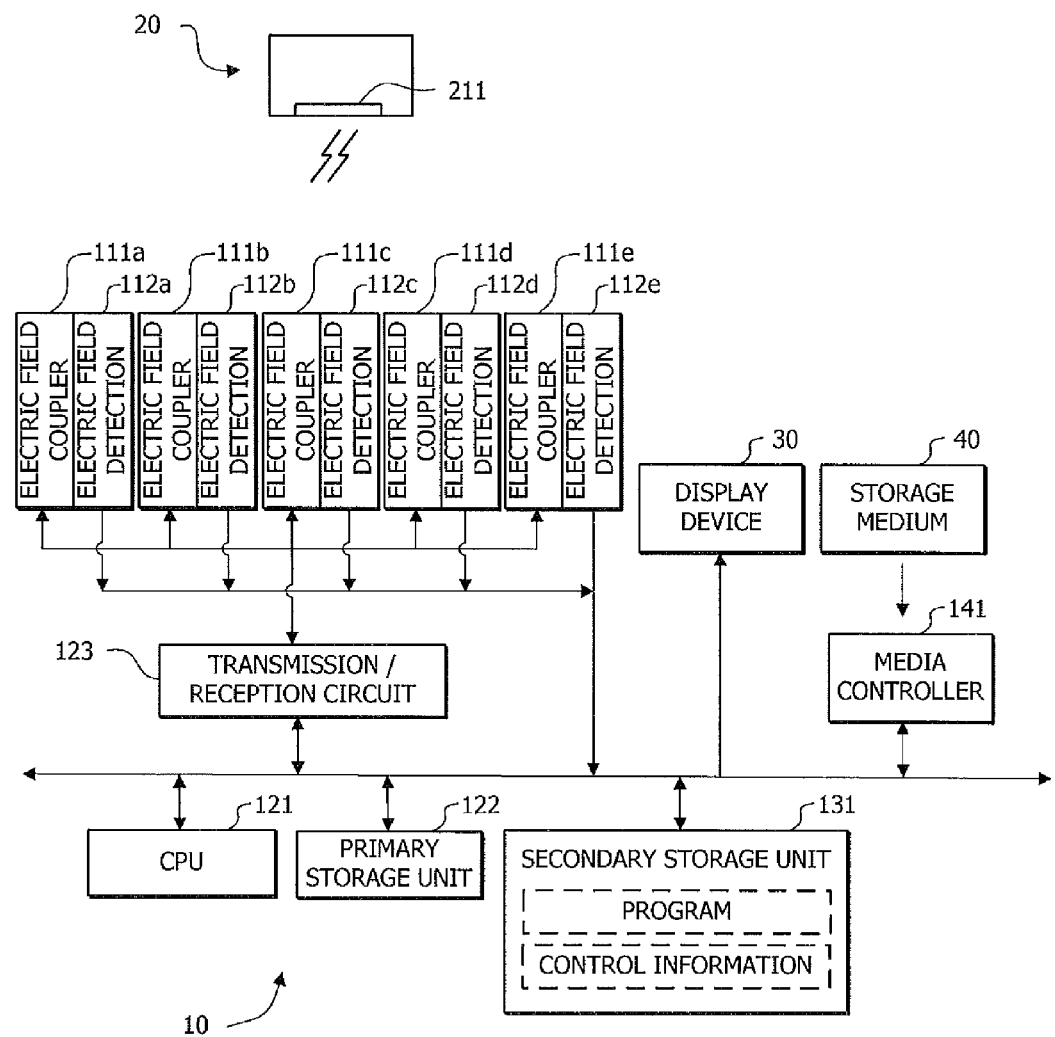
FIG. 7 is a block diagram showing the hardware configuration of the communication apparatus according to the embodiment of the invention.

Referring to FIG. 7, the hardware configuration of the communication apparatus 10 will be described next. As illustrated, the communication apparatus 10 includes electric field coupler elements 111a to 111e, electric field detection circuits 112a to 112e, a CPU (Central Processing Unit) 121, a primary storage unit 122, a transmission/reception circuit 123, a secondary storage unit 131, and a media controller 141.

The communication units 110a to 110e in FIG. 2 are respectively realized by the electric field coupler elements 111a to 111e and the electric field detection circuits 112a to 112e shown in FIG. 7.

Each of the electric field coupler elements 111a to 111e establishes electric field coupling with an electric field coupler element 211, provided in the portable device 20, to communicate therewith when the electric field coupler element 211 is positioned within a predetermined distance of 3 cm or so, for example. Each of the electric field coupler elements 111a to 111e has a coupling electrode for transmitting/receiving a high-frequency signal to/from a coupling electrode provided in the electric field coupler element 211, and a resonance stub which enhances the electric coupling of the coupling electrode. The electric field coupler elements 111a to 111e are connected to the respective electric field detection circuits 112a to 112e. The electric field coupler elements 111a to 111e are connected to the transmission/reception circuit 123 via signal lines for transferring a high-frequency signal to be transmitted/received to/from the coupling electrode of the portable device 20.

Each of the electric field detection circuits 112a to 112e detects an electric field intensity in response to establishment of the electric field coupling of the associated one of the electric field coupler elements 111a to 111e with the electric field coupler element 211 of the portable device 20, and supplies an electric field signal representing the detected electric field intensity to the CPU 121.

The CPU 121 shown in FIG. 7 realizes the control unit 120 in FIG. 2 in cooperation with the primary storage unit 122 and the transmission/reception circuit 123. The primary storage unit 122 is constituted by a RAM (Random Access Memory) or the like, and works as a working memory or the like for the CPU 121. That is, various kinds of data the CPU 121 receives from other components (e.g., each of the electric field detection circuits 112a to 112e and the storage medium 40), and various kinds of data the CPU 121 supplies to other components (e.g., the secondary storage unit 131 and the display device 30) are temporarily stored in a memory area of the primary storage unit 122. Under control of the CPU 121, the transmission/reception circuit 123 modulates a carrier wave with the data received from the CPU 121, and supplies a high-frequency signal acquired through the modulation process to one of the electric field coupler elements 111a to 111e. In addition, under control of the CPU 121, the transmission/reception circuit 123 demodulates the high-frequency signal received from one of the electric field coupler elements 111a to 111e, and supplies data (baseband signal) acquired through the demodulation process to the CPU 121.

The secondary storage unit 131 shown in FIG. 7 realizes the storage unit 130 in FIG. 2. The secondary storage unit 131 is constituted by a hard disk, a flash memory or the like, and has a communication control program and predetermined control information or the like stored therein.

The media controller 141 shown in FIG. 7 realizes the read/write unit 140 in FIG. 2. The media controller 141 is an interface unit which reads and writes data.

The display device 30 includes a drive circuit and a display panel. The control unit 120 generates display data such as RGB (RED-GREEN-BLUE) data from various kinds of video data and supplies the generated display data to the drive circuit. The drive circuit drives the display panel based on the display data supplied from the control unit 120 to display various video images represented by the display data on the display panel.

Various kinds of content data transmitted from the portable device 20 are written in the storage medium 40 shown in FIGS. 2 and 7 by the media controller 141. The content data recorded in the storage medium 40 may be read out and then output to the display device 30 by the media controller 141.

Referring to FIGS. 8 to 11, the operation of the communication apparatus 10 will be described next. First, a description will be given of the selection operation which is executed by the communication apparatus 10.

Figure 12A:
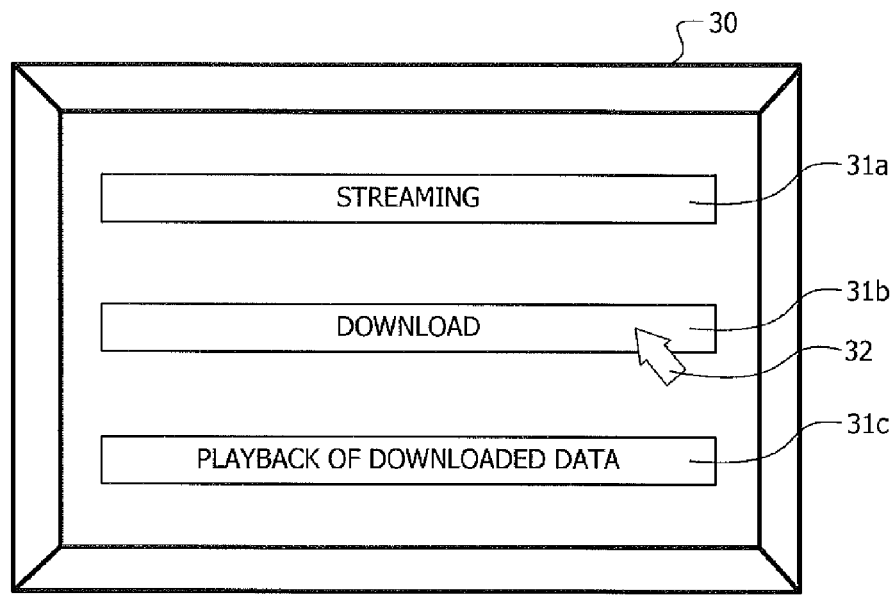
FIG. 12A is a diagram showing a top menu to be displayed on the screen of a display device.

When a user powers the communication apparatus 10 on (turns on a power switch), the control unit 120 supplies data for displaying a top menu to the screen of the display device 30. The display device 30 receives the data from the control unit 120, and displays the top menu on the screen under control of the control unit 120 (step S801 in FIG. 8). Displayed on the screen (display panel) of the display device 30 are a selection item 31a indicating a streaming process, a selection item 31b indicating a download process, a selection item 31c indicating a playback process for downloaded data, and a cursor 32 to indicate one of the selection items 31a to 31c, as shown in FIG. 12A.

Figure 8:
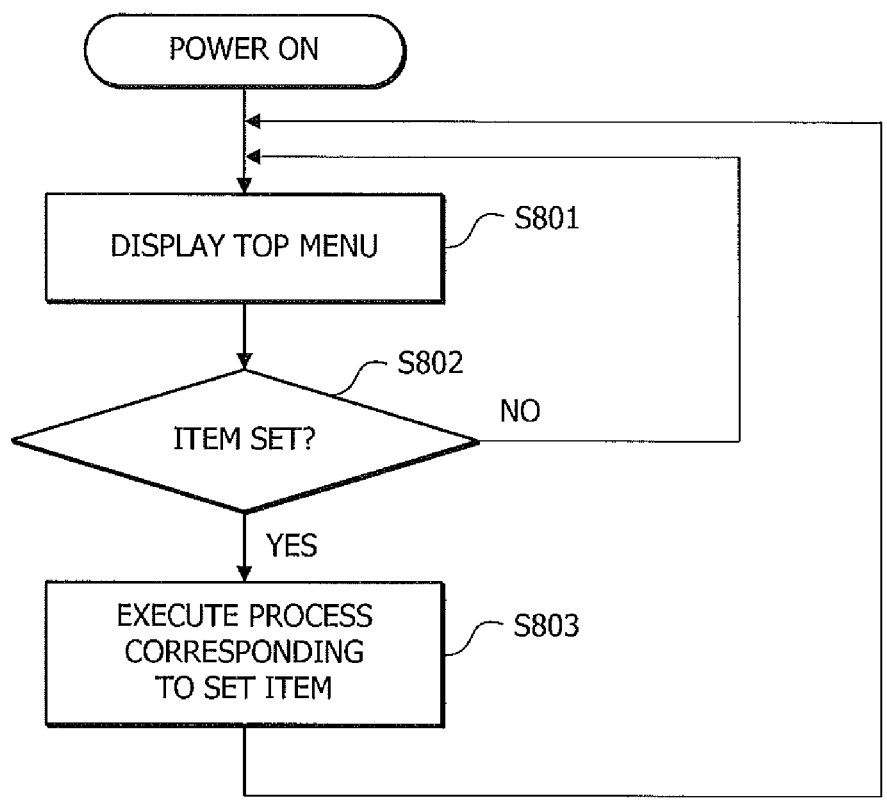
FIG. 8 is a flowchart illustrating the general process that is carried out by the communication apparatus according to the embodiment of the invention.

The control unit 120 waits for the user's operation to select one of the selection items 31a to 31c on the top menu (step S802 in FIG. 8).

The user confirms the individual selection items 31a to 31c and the cursor 32 on the top menu displayed on the screen of the display device 30, and moves the portable device 20 near the top surface portion 100 of the communication apparatus 10.

To move the cursor 32 "upward", for example, the user moves the portable device 20 to a position in a predetermined direction from the center of the top surface portion 100 of the communication apparatus 10. The "predetermined direction" is previously set to, for example, a direction where a connection cord to connect the communication apparatus 10 to the display device 30 is provided. This is because the display device 30 is normally set up in the direction where the connection cord is provided, so that the direction where the connection cord is provided is frontward of the user facing the display device 30, and is conceptionally easily related to the upward direction of the cursor 32. Accordingly, hereinafter, the predetermined direction is defined as the upward direction from the center of the top surface portion 100, and the downward direction (i.e., opposite to the predetermined direction), the leftward direction and the rightward direction are likewise defined.

To move the cursor 32 "downward", the user moves the portable device 20 to a downward position from the center of the top surface portion 100 of the communication apparatus 10.

To "set" the selection target specified by the cursor 32, the user moves the portable device 20 to the central position of the top surface portion 100 of the communication apparatus 10.

When the communication unit 210 of the portable device 20 comes within a predetermined distance of 3 cm or so to the communication unit 110 (one of 110a to 110e) of the communication apparatus 10 according to the movement of the portable device 20, the communication unit 210 is electric-field coupled with the communication unit 110 (one of 110a to 110e).

In response to the electric field coupling, the communication unit 110 (one of 110a to 110e) which has established electric field coupling with the communication unit 210 detects the intensity of the electric field generated by the electric field coupling, and supplies an electric field signal representing the electric field intensity to the control unit 120.

Upon reception of the electric field signal from the communication unit 110, the control unit 120 reads the communication control program from the program storage section 130a through timer interruption or the like. To carry out the selection process of selecting one of the selection items 31a to 31c shown on the top menu, the control unit 120 executes a selection process shown in FIG. 9 in this situation.

Figure 9:
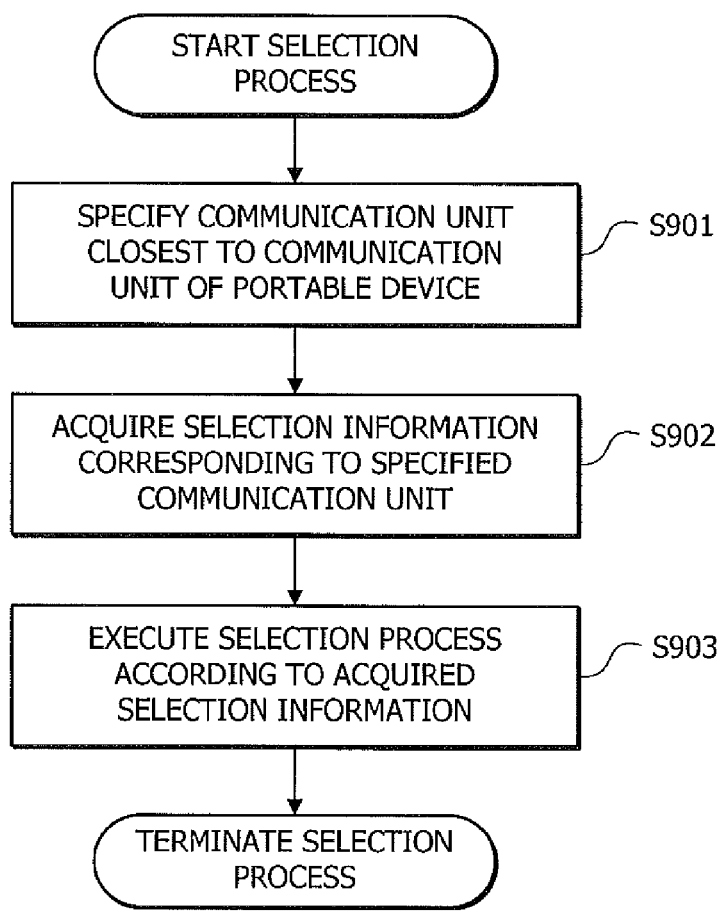
FIG. 9 is a flowchart illustrating a selection process that is carried out by the communication apparatus according to the embodiment of the invention.

The control information acquisition section 120a specifies a communication unit closest to the communication unit 210 of the portable device 20 using the electric field signal received from the communication unit 110 (one of 110a to 110e) (step S901 in FIG. 9).

The electric field intensity represented by the electric field signal received by the control unit 120 is inversely proportional to the fourth power of the distance between the communication unit 110 and the communication unit 210 (between the coupling electrodes). That is, the control information acquisition section 120a specifies the communication unit 110 which has supplied the electric field signal that represents the maximum electric field intensity to the control unit 120, as the communication unit closest to the communication unit 210.

To prevent erroneous operation or the like of the user, the control information acquisition section 120a may specify the communication unit 110 which is closest to the communication unit 210 when and only when an electric field signal representing an electric field intensity equal to or greater than a preset value is supplied to the control unit 120.

Further, when two or more communication units closest to the communication unit 210 and having the same distance thereto are specified, the control information acquisition section 120a may specify the communication unit 110 which is closest to the communication unit 210 according to a preset priority rank.

Thereafter, the control information acquisition section 120a acquires control information corresponding to the communication unit closest to the communication unit 210 of the portable device 20 from the control information storage section 130b (step S902 in FIG. 9).

Specifically, when the control information acquisition section 120a specifies the communication unit 110a as the communication unit closest to the communication unit 210 of the portable device 20 (step S901 in FIG. 9), the control information acquisition section 120a acquires selection information indicating the process of carrying out "setting" from the control information storage section 130b based on the ID information "110a" in a table shown in FIG. 3 (step S902 in FIG. 9). Next, the control unit 120 "sets" the item specified by the cursor 32 displayed on the screen of the display device 30 (step S903 in FIG. 9). That is, in this situation, the communication unit 110a functions as the SET key, and the control unit 120 performs control to execute a process corresponding to the item specified by the cursor 32 displayed on the screen of the display device 30 based on the user's operation of the SET key (step S803 in FIG. 8).

When the control information acquisition section 120a specifies the communication unit 110b as the communication unit closest to the communication unit 210 of the portable device 20 (step S901 in FIG. 9), the control information acquisition section 120a acquires selection information indicating the process of moving the cursor 32 displayed on the screen of the display device 30 "upward" from the control information storage section 130b based on the ID information "110b" in the table shown in FIG. 3 (step S902 in FIG. 9), and the control unit 120 moves the cursor 32 displayed on the screen of the display device 30 "upward" (step S903 in FIG. 9). That is, in this situation, the communication unit 110b functions as the UP cursor key, and the control unit 120 performs control to move the cursor 32 displayed on the screen of the display device 30 to an item positioned upward and specify the item (step S803 in FIG. 8).

When the control information acquisition section 120a specifies the communication unit 110c as the communication unit closest to the communication unit 210 of the portable device 20 (step S901 in FIG. 9), the control information acquisition section 120a acquires selection information indicating the process of moving the cursor 32 displayed on the screen of the display device 30 "downward" from the control information storage section 130b (step S902 in FIG. 9), and the control unit 120 moves the cursor 32 displayed on the screen of the display device 30 "downward" (step S903 in FIG. 9). That is, in this situation, the communication unit 110c functions as the DOWN cursor key, and the control unit 120 performs control to move the cursor 32 displayed on the screen of the display device 30 to an item positioned downward and specify the item (step S803 in FIG. 8).

Figure 12B:
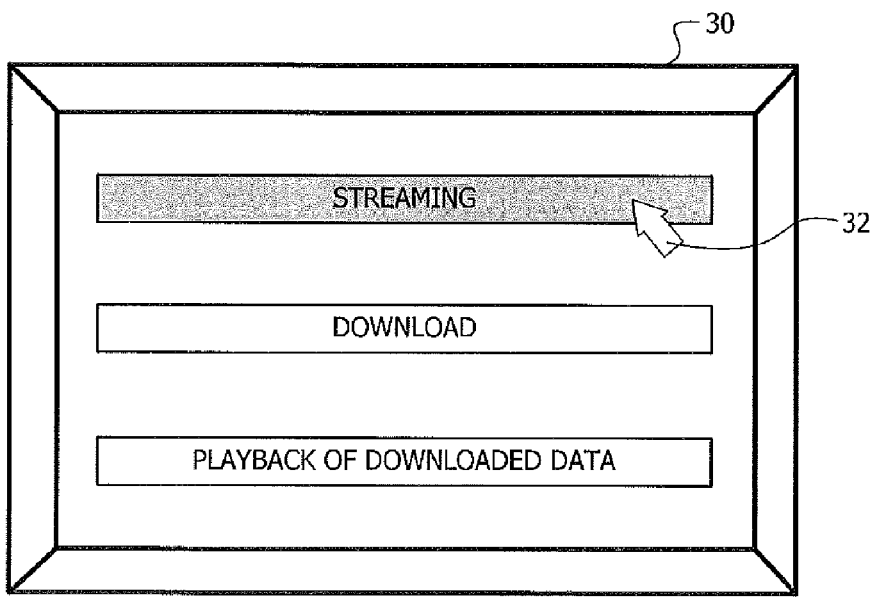
FIG. 12B is a diagram showing the state of the screen of the display device when a cursor is moved on the screen.

Next, the streaming operation that is carried out by the communication apparatus 10 will be described. According to the embodiment, according to the user's operation to move the portable device 20, the control unit 120 moves the cursor 32 to the selection item 31a indicative of the streaming process displayed on the screen of the display device 30, and sets the selection item 31a. As shown in FIG. 12B, the display device 30 performs highlighting, flickering or the like of the item specified by the cursor 32 (selection item 31a in this case) under control of the control unit 120 to permit the user to easily identify the item selected by the movement of the cursor 32.

Next, the streaming operation that is executed by the control unit 120 of the communication apparatus 10 will be described. It is to be noted that redundant descriptions of the process of setting a selection process from the top menu shown in FIG. 8 and a process similar to the selection process shown in FIG. 9 will be omitted adequately.

The control unit 120 refers to the directory of a storage unit (not shown) or the like of the portable device 20 via the communication unit 110 (e.g., communication unit 110a) which has established electric field coupling with the communication unit 210 of the portable device 20. Next, the control unit 120 creates data representing a list of streamable files (including a streamable folder), and supplies the data to the display device 30. The display device 30 receives the list data from the control unit 120, and displays the list of streamable files or the like under control of the control unit 120 (step S1001 in FIG. 10).

Figure 13:
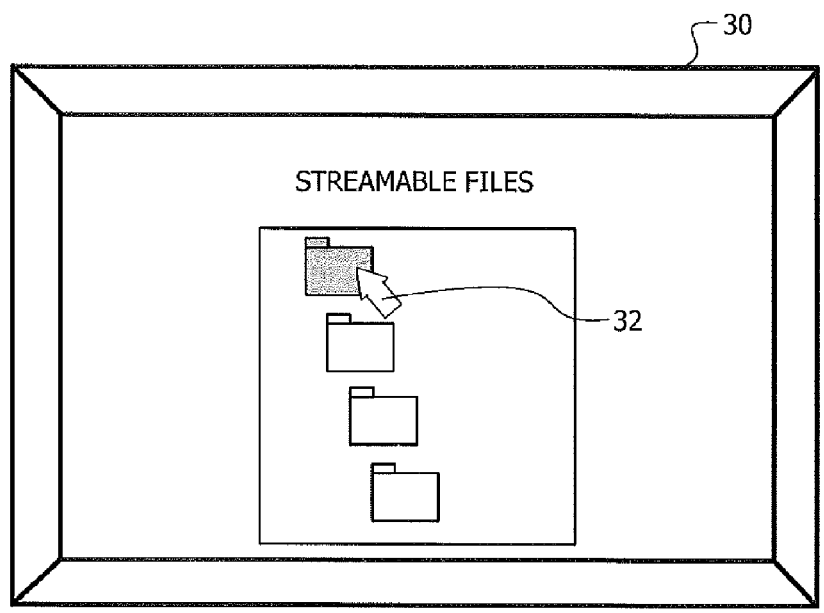
FIG. 13 is a diagram showing a list of streamable files or the like to be displayed on the screen of the display device.

As shown in FIG. 13, the screen (display panel) of the display device 30 displays a list of streamable files or the like, which are stored and managed in the portable device 20, in a hierarchical manner (tree-like manner). At this time, the display device 30 performs highlighting, flickering or the like of a file or the like specified by the cursor 32 (e.g., the topmost file) under control of the control unit 120, so that the user easily identifies the position of the cursor 32 on the screen of the display device 30. The control unit 120 waits for a file to be streamed to be selected by the operation of the user.

The user checks the list of streamable files or the like and the cursor 32 displayed on the screen of the display device 30, and moves the portable device 20 near the top surface portion 100 of the communication apparatus 10 as in the operation that has been performed by the user in setting a selection item from the top menu.

To select a directly overlying or underlying file or the like in the same layer, for example, the user moves the portable device 20 to an upward position or a downward position from the center of the top surface portion 100 of the communication apparatus 10.

To select a file or the like located in one layer above or one layer below, the user moves the portable device 20 to a rightward position or a leftward position from the center of the top surface portion 100 of the communication apparatus 10.

To "set" a file specified by the cursor 32, displayed on the screen of the display device 30, as a file to be streamed, the user moves the portable device 20 to the central position of the top surface portion 100 of the communication apparatus 10.

When the communication unit 110 (one of 110a to 110e) of the communication apparatus 10 which has established electric field coupling with the communication unit 210 of the portable device 20 according to the movement of the portable device 20 supplies the electric field signal to the control unit 120, the control unit 120 executes the selection process shown in FIG. 9 (the steps S901 to S903).

Specifically, when the control information acquisition section 120a acquires selection information indicating the process of "setting" a selection target from the control information storage section 130b, the control unit 120 sets a file specified by the cursor 32, displayed on the screen of the display device 30, as a file to be streamed.

When the control information acquisition section 120a acquires selection information indicating the process of moving the cursor 32 "upward" or selection information indicating the process of moving the cursor 32 "downward" from the control information storage section 130b, the control unit 120 moves the cursor 32 displayed on the screen of the display device 30 "upward" or "downward" to select a directly overlying or underlying file or the like in the same layer.

When the control information acquisition section 120a acquires selection information indicating the process of moving the cursor 32 "rightward" or selection information indicating the process of moving the cursor 32 "leftward" from the control information storage section 130b, the control unit 120 moves the cursor 32 displayed on the screen of the display device 30 "rightward" or "leftward" to select a file or the like located in one layer above or one layer below.

The cursor 32 displayed on the screen of the display device 30 moves according to the selection information selected by the control information acquisition section 120a. At this time, the display device 30 performs highlighting, flickering or the like of a file or the like specified by the cursor 32 under control of the control unit 120, so that the user easily identifies the file or the like specified by the movement of the cursor 32.

Figure 10:
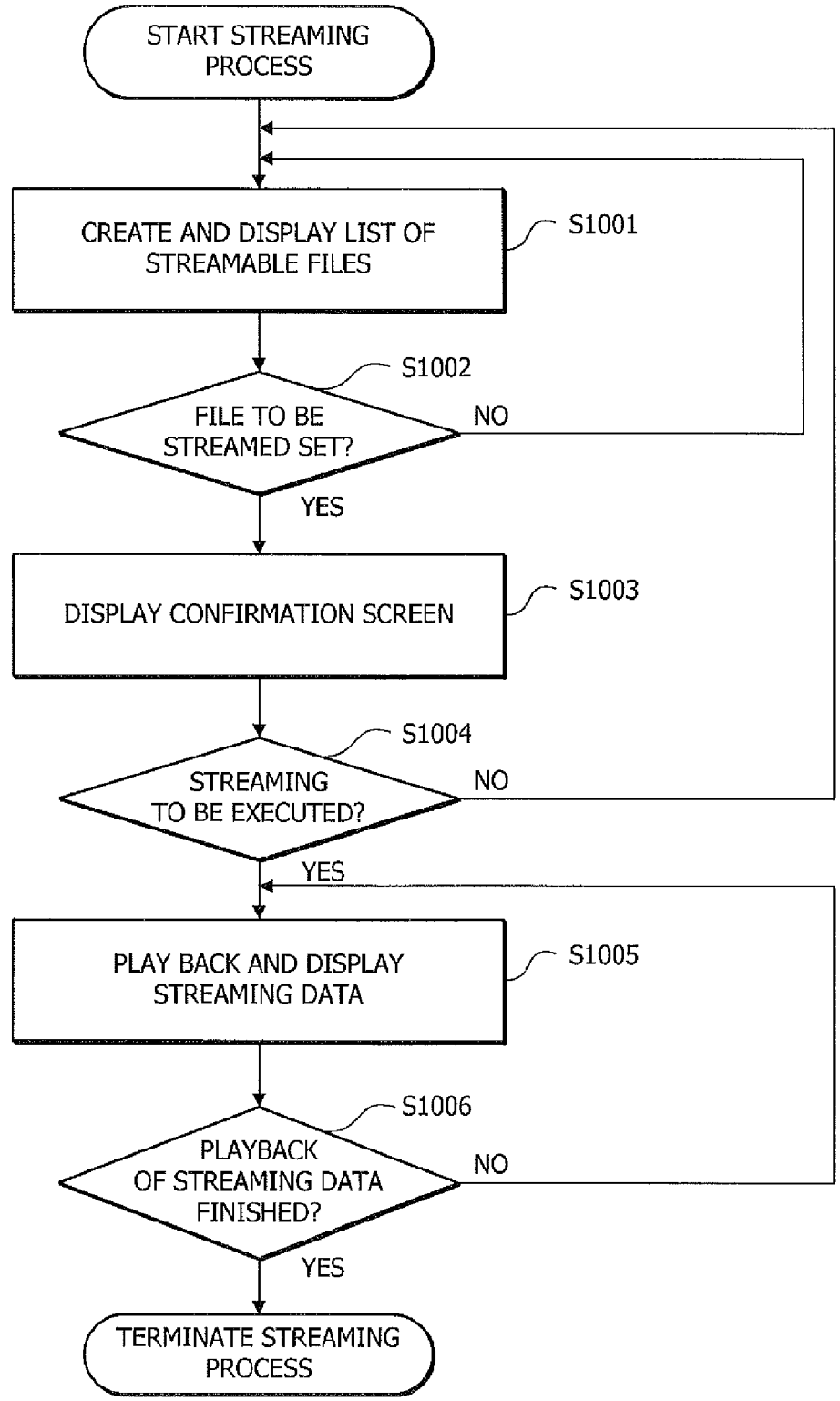
FIG. 10 is a flowchart illustrating a streaming process that is carried out by the communication apparatus according to the embodiment of the invention.

Then, the control unit 120 determines whether or not a file to be streamed has been set from the list of streamable files or the like which is displayed on the screen of the display device 30 (step S1002 in FIG. 10).

When a file to be streamed has not been set from the list of streamable files or the like in the selection process (step S1002; No), the control unit 120 returns to step S1001 to execute control to display the list of streamable files or the like after the movement of the cursor 32 on the display device 30. When a file to be streamed has been set from the list of streamable files or the like in the selection process (step S1002; Yes), on the other hand, the control unit 120 displays a confirmation screen on the screen (display panel) of the display device 30 (step S1003 in FIG. 10).

Figure 14:
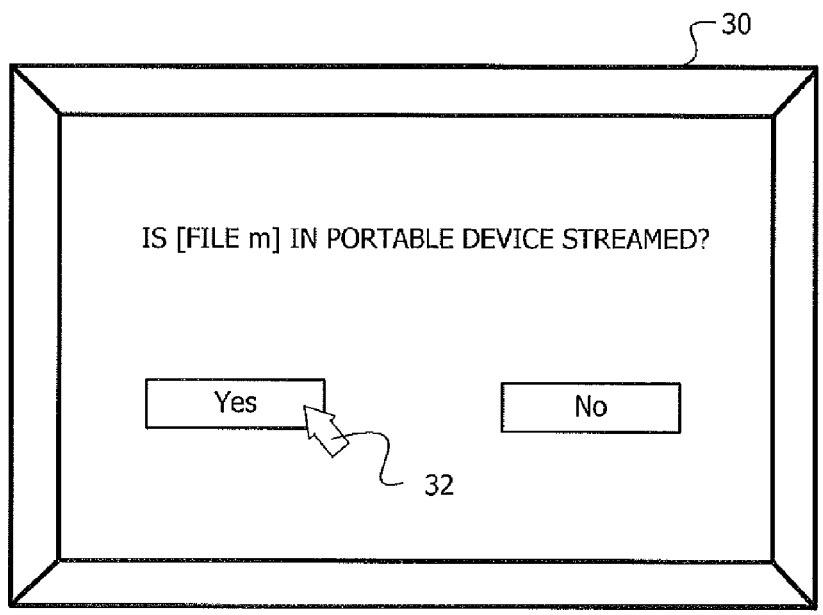
FIG. 14 is a diagram showing a confirmation screen to be displayed on the screen of the display device.

The name or the like of the file to be streamed which has been selected and set in the selection process (steps S901 to S903 in FIG. 9) is displayed on the screen of the display device 30. Under control of the control unit 120, the display device 30 displays a confirmation screen to allow the user to select whether or not to steam the file set in the selection process (step S1003), for example, as shown in FIG. 14. The control unit 120 waits for the user's operation to select whether or not to execute the streaming of the file.

The user checks items displayed on the screen of the display device 30 (items "Yes" and "No" shown in FIG. 14) and the cursor 32, and moves the portable device 20 near the top surface portion 100 of the communication apparatus 10 as in the foregoing process.

The communication unit 110 (one of 110*a* to 110*e*) of the communication apparatus 10 which has established electric field coupling with the communication unit 210 of the portable device 20 according to the movement of the portable device 20 supplies the electric field signal to the control unit 120. Upon reception of the electric field signal from the communication unit 110, the control unit 120 executes the selection process shown in FIG. 9 as in the foregoing process (the steps S901 to S903).

Thereafter, the control unit 120 determines whether or not execution of streaming has been selected on the confirmation screen displayed on the display device 30 (S1004 in FIG. 10).

When execution of streaming has not been selected in the selection process (when the item "No" has been set) (step S1004; No), the control unit 120 returns to step S1001 and repeats the foregoing process. When execution of streaming has been selected in the selection process (when the item "Yes" has been set) (step S1004; Yes), on the other hand, the control unit 120 performs control to execute streaming of the file to be streamed, and display the streaming data on the display device 30 (step S1005 in FIG. 10).

Thereafter, the control unit 120 controls communication between the communication apparatus 10 and the portable device 20. The communication unit 110*a* which functions as the SET key in the selection process shown in FIG. 9 executes communication with the communication unit 210 of the portable device 20 under control of the control unit 120. The communication unit 110*a* specifies a file to be streamed which has been set in the selection process, and requests the communication unit 210 of the portable device 20 for the file.

In response to the request, the communication unit 210 of the portable device 20 transmits the requested file as streaming data to the communication unit 110*a* in a predetermined communication band (e.g., several tens Mbps) under control of the control unit (not shown) of the portable device 20. The communication unit 110*a* supplies the streaming data sequentially received from the communication unit 210 to the control unit 120. The control unit 120 generates display data, such as RGB data, based on the streaming data sequentially received from the communication unit 110*a*, and supplies the generated display data to the drive circuit of the display device 30. The drive circuit drives the display panel based on the display data supplied from the control unit 120 to display various video images represented by the display data on the screen (display panel) of the display device 30.

Figure 15:
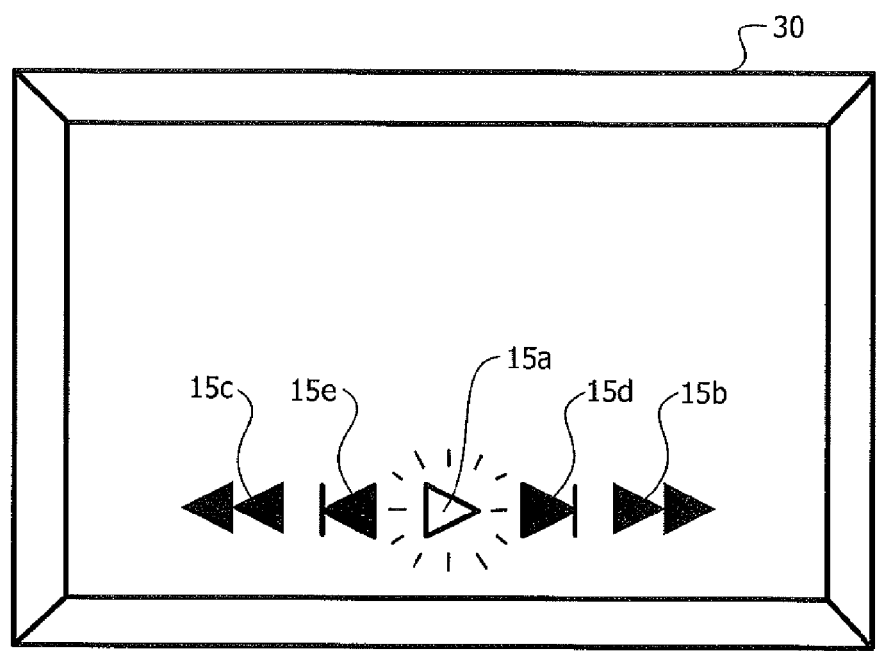
FIG. 15 is a diagram showing various keys representing the contents of display control which are displayed on the screen of the display device.

As shown in FIG. 15, the screen (display panel) of the display device 30 shows various keys representing the contents of display control (contents of the display control which is executed in association with the user's operation) on streaming data, such as a PLAYBACK key 15*a*, FAST FORWARD key 15*b*, a REWIND key 15*c*, a NEXT CHAPTER key 15*d*, and a PREVIOUS CHAPTER key 15*e*. For the user to easily identify the contents of the display control on the current streaming data, the display device 30 performs highlighting, flickering or the like of the various keys 15*a* to 15*e* corresponding to the contents of the display control under control of the control unit 120. When the current streaming data is displayed on the screen of the display device 30 in normal playback mode, for example, highlighting or the like of the PLAYBACK key 15*a* equivalent to normal playback is performed.

Thereafter, the control unit 120 waits for the user's operation to request display control on the streaming data.

The user checks the streaming data and the various keys 15 (15*a* to 15*e*) reproduced and displayed on the screen of the display device 30, and moves the portable device 20 near the top surface portion 100 of the communication apparatus 10 as in the foregoing process.

When the streaming data displayed on the screen of the display device 30 is fast-forwarded or rewound, for example, the user moves the portable device 20 to an upward position or a downward position from the center of the top surface portion 100 of the communication apparatus 10, respectively.

To move the streaming data displayed on the screen of the display device 30 to the next chapter or return the streaming data to the previous chapter, the user moves the portable device 20 to a rightward position or a leftward position from the center of the top surface portion 100 of the communication apparatus 10, respectively.

To play back the streaming data displayed on the screen of the display device 30 at the normal playback speed, the user moves the portable device 20 to the central position of the top surface portion 100 of the communication apparatus 10.

The communication unit 110 (one of 110*a* to 110*e*) of the communication apparatus 10 which has established electric field coupling with the communication unit 210 of the portable device 20 according to the movement of the portable device 20 supplies the electric field signal to the control unit 120.

Upon reception of the electric field signal from the communication unit 110, the control unit 120 reads the communication control program from the program storage section 130*a* through timer interruption or the like. To carry out display control on the streaming data displayed on the screen of the display device 30, the control unit 120 executes a display control process shown in FIG. 11 in this situation.

Specifically, when the control information acquisition section 120*a* specifies the communication unit 110*b* as the communication unit closest to the communication unit 210 of the portable device 20 (step S1101 in FIG. 11), the control information acquisition section 120*a* acquires display control information representing "fast forward" from a table shown in FIG. 4 stored in the control information storage section 130*b* based on the ID information "110*b*" (step S1102 in FIG.

11). Next, the control unit 120 having the control information acquisition section 120a executes control to fast-forward the data displayed on the screen of the display device 30 (step S1103 in FIG. 11). That is, in this situation, the communication unit 110b functions as the FAST FORWARD key, and the control unit 120 fast-forwards the data displayed on the screen of the display device 30 based on the user's operation of the FAST FORWARD key.

When the control information acquisition section 120a has acquired display control information representing "fast forward" from the control information storage section 130b, the control information acquisition section 120a acquires fast-forward speed control information for controlling the fast forward speed from a table shown in FIG. 5 stored in the control information storage section 130b based on the electric field intensities represented by the electric field signals supplied from the communication units 110a and 110b.

Specifically, the control information acquisition section 120a acquires the difference (X=Ec2−Ec1) between the electric field intensity Ec1 from the communication unit 110a and the electric field intensity Ec2 from the communication unit 110b, and acquires fast-forward speed control information associated with the range where the value (X) lies from the table in FIG. 5.

Next, the control unit 120 carries out control to fast-forward the data displayed on the screen of the display device 30 at the fast forward speed given by the fast-forward speed control information acquired by the control information acquisition section 120a. When the difference between the electric field intensity Ec1 and the electric field intensity Ec2 from the communication unit 110b lies within the range of $a<X\leq b$, for example, the control information acquisition section 120a acquires fast-forward speed control information representing the fast forward speed of "×1.5 speed", and the control unit 120 fast-forwards the data displayed on the screen of the display device 30 at the ×1.5 speed. That is, the fast forward speed can be adjusted according to the positional relationship between the communication units 110a, 110b and the communication unit 210 by moving the portable device 20 between the communication units 110a, 110b.

Figure 11:
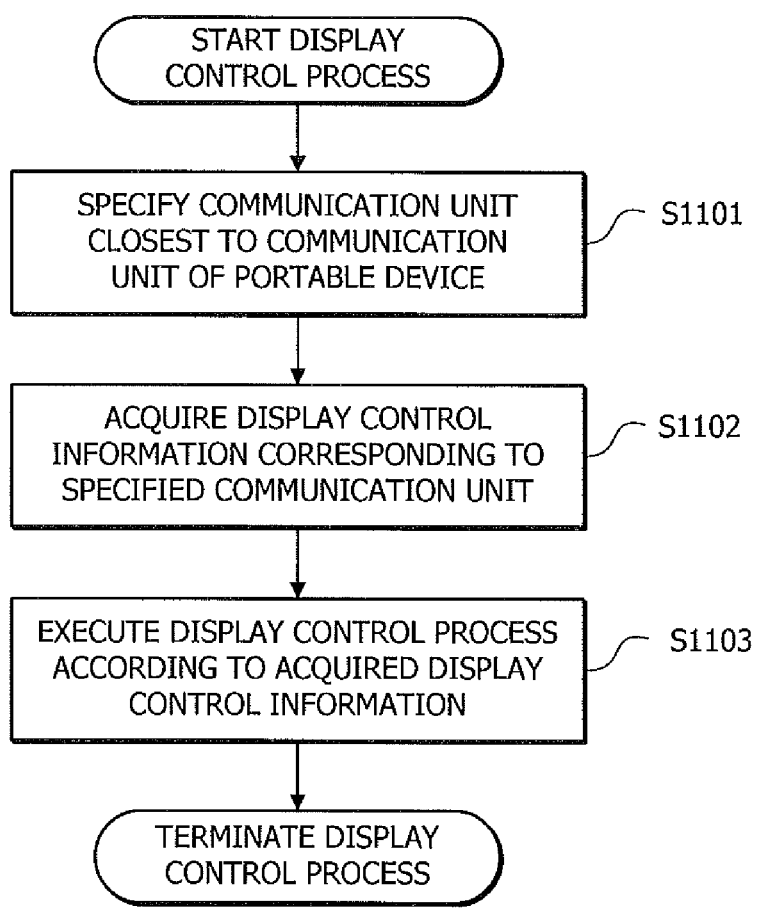
FIG. 11 is a flowchart illustrating a display control process that is carried out by the communication apparatus according to the embodiment of the invention.

When the control information acquisition section 120a specifies the communication unit 110c as the communication unit closest to the communication unit 210 of the portable device 20 (step S1101 in FIG. 11), the control information acquisition section 120a acquires display control information representing "rewind" from the table shown in FIG. 4 based on the ID information "110c" (step S1102 in FIG. 11), and the control unit 120 executes control to rewind the data displayed on the screen of the display device 30 (step S1103 in FIG. 11). That is, in this situation, the communication unit 110c functions as the REWIND key, and the control unit 120 rewinds the data displayed on the screen of the display device 30 based on the user's operation of the REWIND key.

When the control information acquisition section 120a has acquired display control information representing "rewind" from the control information storage section 130b, the control information acquisition section 120a acquires rewind speed control information for controlling the rewind speed from a table shown in FIG. 6 stored in the control information storage section 130b based on the electric field intensities represented by the electric field signals supplied from the communication units 110a and 110c.

The control information acquisition section 120a acquires the difference (Y=Ec3−Ec1) between the electric field intensity Ec1 from the communication unit 110a and the electric field intensity Ec3 from the communication unit 110c, and acquires rewind speed control information associated with the range where the value (Y) lies from the table in FIG. 6.

The control unit 120 carries out control to rewind the data displayed on the screen of the display device 30 at the rewind speed given by the rewind speed control information acquired by the control information acquisition section 120a. When the difference between the electric field intensity Ec1 and the electric field intensity Ec3 from the communication unit 110c lies within the range of $g<Y\leq h$, for example, the control information acquisition section 120a acquires rewind speed control information representing the rewind speed of "×3 speed", and the control unit 120 rewinds the data displayed on the screen of the display device 30 at the ×3 speed. That is, the rewind speed can be adjusted according to the positional relationship between the communication units 110a, 110c and the communication unit 210 by moving the portable device 20 between the communication units 110a, 110c.

When the control information acquisition section 120a specifies the communication unit 110d and the communication unit 110e as the communication units closest to the communication unit 210 of the portable device 20 (step S1101 in FIG. 11), the control information acquisition section 120a acquires display control information for moving to a "next chapter" and display control information for moving to a "previous chapter" from the control information storage section 130b (step S1102 in FIG. 11), and the control unit 120 executes control to move the current chapter represented by the data displayed on the screen of the display device 30 to the next chapter and to the previous chapter (step S1103 in FIG. 11). That is, in this situation, the communication unit 110d functions as the NEXT CHAPTER key, and the control unit 120 moves the data displayed on the screen of the display device 30 to the next chapter based on the user's operation of the NEXT CHAPTER key. Further, in this situation, the communication unit 110e functions as the PREVIOUS CHAPTER key, and the control unit 120 returns the data displayed on the screen of the display device 30 to the previous chapter based on the user's operation of the PREVIOUS CHAPTER key.

When the control information acquisition section 120a specifies the communication unit 110a as the communication unit closest to the communication unit 210 of the portable device 20 (step S1101 in FIG. 11), the control information acquisition section 120a acquires display control information for executing "normal playback (×1 speed playback)" from the control information storage section 130b (step S1102 in FIG. 11), and the control unit 120 executes control to play back the data displayed on the screen of the display device 30 at the normal speed (×1 speed) (step S1103 in FIG. 11). That is, in this situation, the communication unit 110a functions as the PLAYBACK key, and the control unit 120 plays back the data displayed on the screen of the display device 30 based on the user's operation of the PLAYBACK key at the normal speed (×1 speed).

Thereafter, the control unit 120 determines whether or not playback of the streaming data displayed on the screen of the display device 30 has been finished, for example, after execution of the display control process or for each given time (step S1006 in FIG. 10).

When playback of the streaming data displayed on the screen of the display device 30 has not been finished (step S1006; No), the control unit 120 returns to step S1005 to resume displaying the streaming data displayed on the screen of the display device 30, and waits for the user's operation of requesting display control of the streaming data. The user can request display control of the streaming data displayed on the screen of the display device 30 through one of the communication units 110a to 110e which function as various operational keys by moving the portable device 20 near the top surface portion 100 of the communication apparatus 10 until playback of the streaming data is terminated (step S1006; Yes). When playback of the streaming data has been finished (step S1006; Yes), on the other hand, the control unit 120 terminates the streaming process. Then, the control unit 120 returns to step S801 to display the top menu again.

Although the streaming process corresponding to the selection item 31a on the top menu is carried out according to the setting of the selection item 31a according to the embodiment, the streaming process can be executed similarly even when another selection item 31b, 31c is set.

When the selection item 31b indicating the download process in FIG. 12A is set, for example, it is necessary to specify a file to be downloaded, specify a folder where the file is to be stored, and decide execution of the downloading in order to execute the download process, those necessary procedures can be carried out as the user moves the portable device 20 near the top surface portion 100 of the communication apparatus 10.

When the selection item 31c indicating the playback process for downloaded data in FIG. 12A is selected and set, it is necessary to specify a file to be played back, decide execution of the playback of the file and execute display control of playback data to be displayed on the screen of the display device 30 in order to execute the playback process of the downloaded data, those necessary procedures can likewise be carried out as the user moves the portable device 20 near the top surface portion 100 of the communication apparatus 10.

According to the embodiment, as described above, it is possible to execute processes, such as downloading, streaming and playback of downloaded data, through a simple operation of allowing the user to move the portable device 20 near the top surface portion 100 of the communication apparatus 10. This can enhance the operability of the user particularly before and during data communication.

Although the foregoing description of the embodiment has been given of the mode where wireless communication between communication units is carried out using electric field coupling, the invention is not limited to this mode, and may be similarly worked out in a case of using magnetic field coupling.

The communication control program in the foregoing embodiment may be stored in a portable recording medium (CD-ROM (Compact Disk Read-Only Memory), DVD (Digital Versatile Disk) or the like) to be supplied to the communication apparatus 10. In addition, the communication control program may be supplied to the communication apparatus 10 over a network. The primary storage unit 122, the secondary storage unit 131 or the portable storage medium 40 where the communication control program is stored is a computer readable program product. Further, the communication control program may be designed to operate a computer whose functions are at least partially realized by a dedicated circuit. That is, a computer which generally executes the foregoing processes and a program which operates such a computer would do.

In addition, the individual components of the communication apparatus 10 according to the embodiment can be adequately separated or combined. For example, the communication apparatus 10 may have a device to be connected thereto as its component. Specifically, when a personal computer is used as the communication apparatus 10, the body of the computer may include the control unit 120, the storage unit 130, and the read/write unit 140, and may be connected with devices which constitute the other communication units 110a to 110e.

The invention is not limited to the foregoing embodiment and the accompanying drawings, which may be adequately modified or changed.

While the present invention has been described with reference to the preferred embodiment, it is intended that the invention be not limited by any of the details of the description therein but includes all the embodiments which fall within the scope of the appended claims.

What is claimed is:

1. A non-transitory computer readable storage medium storing a communication control program that causes a computer of a communication apparatus to execute a process comprising:
   an establishing step of establishing electric field coupling or magnetic field coupling between a plurality of first communication units and a second communication unit, wherein the plurality of first communication units are included in the communication apparatus, wherein the second communication unit is included in an external communication device located within a predetermined distance, and wherein the communication apparatus comprises a storage unit storing control information indicative of predetermined control contents in association with two adjacent first communication units of the plurality of first communication units;
   an acquisition step of acquiring from the storage unit control information associated with a value obtained from electric field intensities or magnetic field intensities detected by the two adjacent first communication units which have established the electric field coupling or the magnetic field coupling with the second communication unit; and
   a control step of performing predetermined control on communication between a first communication unit of the plurality of first communication units and the second communication unit using the control information acquired based on the electric field intensities or magnetic field intensities detected by the two adjacent first communication units, while maintaining the communication between the first communication unit and the second communication unit.

2. A communication apparatus comprising:
   a plurality of first communication units that establish electric field coupling or magnetic field coupling with a second communication unit that is included in an external communication device located within a predetermined distance;
   a storage unit storing control information indicative of predetermined control contents in association with a value obtained from electric field intensities or magnetic field intensities detected by two adjacent first communication units of the plurality of first communication units;
   an acquisition section that acquires from the storage unit control information associated with the value obtained from the electric field intensities or the magnetic field intensities detected by the two adjacent first communication units which have established the electric field coupling or the magnetic field coupling with the second communication unit; and
   a control unit that performs predetermined control on communication between a first communication unit of the plurality of first communication units and the second communication unit using the control information acquired based on the electric field intensities or magnetic field intensities detected by the two adjacent first communication units while maintaining the communication between the first communication unit and the second communication unit.

3. The communication apparatus according to claim 2, wherein the storage unit stores, in association with a difference of the electric field intensities or the magnetic field intensities detected by the two adjacent first communication units, control information indicative of predetermined control contents within each of three or more predetermined ranges, the difference being classified in each of the ranges, and wherein the acquisition section acquires from the storage unit the control information based on the difference of the electric field intensities or the magnetic field intensities detected by the two adjacent first communication units which have established the electric field coupling or the magnetic field coupling.

4. The communication apparatus according to claim 2, wherein the communication includes streaming of communication data to be communicated with the external communication device, wherein the control information includes streaming control information for controlling the streaming, and wherein the control unit controls the streaming using the streaming control information.

5. The communication apparatus according to claim 4, wherein the storage unit stores the value obtained from the electric field intensities or the magnetic field intensities detected by the two adjacent first communication units, in association with speed control information for controlling a fast forward speed or a rewind speed of the streaming within each of three or more predetermined ranges, wherein the acquisition section acquires the speed control information from the storage unit based on the value obtained from the electric field intensities or the magnetic field intensities detected by the two adjacent first communication units which have established the electric field coupling or the magnetic field coupling, and wherein the control unit controls the fast forward speed or the rewind speed of the streaming with the external communication device using the speed control information acquired by the acquisition section.

6. The communication apparatus according to claim 4, wherein the storage unit stores a plurality of ranges of values of a difference between electric field intensities or magnetic field intensities detected by a first pair of the first communication units, each of the ranges being stored in association with respective fast forward speed control information, wherein the storage unit stores a plurality of ranges of values of a difference between electric field intensities or magnetic field intensities detected by a second pair of the first communication units, each of the ranges being stored in association with respective rewind forward speed control information, wherein the acquisition section acquires the fast forward speed control information or the rewind speed control information that is associated with one of the stored ranges that includes a difference between the electric field intensities or the magnetic field intensities detected by the first pair or the second pair of the first communication units which have established the electric field coupling or the magnetic field coupling, and wherein the control unit controls the fast forward speed and the rewind speed of the streaming with the external communication device using the fact forward speed control information or the rewind speed control information acquired by the acquisition section.

7. The communication apparatus according to claim 2, wherein the storage unit stores control information indicative of predetermined control contents in association with the value obtained from the electric field intensities or the magnetic field intensities detected by the two adjacent first communication units, for three or more predetermined ranges, wherein the acquisition section acquires the control information from the storage unit based on the value obtained from the electric field intensities or the magnetic field intensities detected by the two adjacent first communication units which have established the electric field coupling or the magnetic field coupling, and wherein the control unit performs predetermined control on the communication using the control information acquired by the acquisition section.

* * * * *